«12» United States Patent
Wang et al.

«10» Patent No.: US 10,355,520 B2
«45» Date of Patent: Jul. 16, 2019

«54» SYSTEM AND METHOD FOR ACHIEVING CONTROLLED LOAD TRANSITION BETWEEN POWER SUPPLIES AND BATTERY BACKUP UNITS

«71» Applicant: Dell Products, L.P., Round Rock, TX (US)

«72» Inventors: Lei Wang, Austin, TX (US); Kunrong Wang, Austin, TX (US); Mehran Mirjafari, Austin, TX (US)

«73» Assignee: Dell Products, L.P., Round Rock, TX (US)

«*» Notice: Subject to any disclaimer, the term of this patent is extended or adjusted under 35 U.S.C. 154(b) by 617 days.

«21» Appl. No.: 15/045,062

«22» Filed: Feb. 16, 2016

«65» Prior Publication Data

US 2017/0237285 A1   Aug. 17, 2017

«51» Int. Cl.
*H02J 9/06* (2006.01)
*G06F 1/30* (2006.01)
*G06F 1/26* (2006.01)

«52» U.S. Cl.
CPC .............. *H02J 9/061* (2013.01); *G06F 1/263* (2013.01); *G06F 1/30* (2013.01); *H02J 9/062* (2013.01)

«58» Field of Classification Search
CPC .............. H02J 9/061; H02J 9/062; G06F 1/30
See application file for complete search history.

«56» References Cited

U.S. PATENT DOCUMENTS

| 8,943,338 B2 * | 1/2015 | Jau | G06F 1/30 307/64 |
| 2013/0227309 A1 * | 8/2013 | Jau | H05K 7/1492 713/300 |
| 2013/0227310 A1 * | 8/2013 | Jau | G06F 1/30 713/300 |

* cited by examiner

*Primary Examiner* — Jared Fureman
*Assistant Examiner* — Emmanuel Dominique
«74» *Attorney, Agent, or Firm* — Fogarty LLP

«57» ABSTRACT

Systems and methods for achieving controlled load transition between power supplies and battery units are described. A method may include determining that a Power Supply Unit (PSU) coupled to an IHS via a power transmission interface is turned off; allowing a Backup Battery Unit (BBU) coupled to the IHS via the power transmission interface and in parallel with the PSU via a current sharing bus to supply all current consumed by the IHS via the power transmission interface while the PSU is turned off, where the PSU and the BBU are each configured to output a current sharing signal onto the current sharing bus that is indicative of the PSU's or BBU's current being supplied to the IHS via the power transmission interface; reducing a current sharing scaling factor of the BBU; determining that the PSU is turned back on; and increasing the current sharing scaling factor of the BBU.

20 Claims, 4 Drawing Sheets

SYSTEM AND METHOD FOR ACHIEVING CONTROLLED LOAD TRANSITION BETWEEN POWER SUPPLIES AND BATTERY BACKUP UNITS

FIELD

This disclosure relates generally to Information Handling Systems (IHSs), and more specifically, to systems and methods for controlling a load transition between power supplies and battery backup units.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

There is a trend to deploy low-voltage Battery Backup Units (BBUs) inside an IHS as a distributed Uninterruptible Power Supply (UPS), therefore replacing traditional central AC UPS systems. In the event of an AC power interruption, the battery backup unit (BBU) may take over the load of the IHS (i.e., equipment that is powered by the BBUs and power supply units or "PSUs") in real time and maintain continuous powering of the IHS for a period of time sufficient to switch over to an alternative power source or to complete an orderly shutdown.

Once the AC power source or the alternative power source (usually a backup generator) is up and ready, the load is transferred from all the BBUs back to the PSUs powered by the AC power sources. If such a power transfer happens simultaneously across all IHSs in the data center, however, the abrupt heavy loading (typically in the order of less than one second) can be much faster than the inertia/response speed of a backup generator, and may overload the backup generator, leading to its shutdown.

A conventional approach to avoiding such an overloading and shutdown includes adopting a randomized transition at data center level—i.e., each IHS's power transfer is initiated at a randomized time within, for instance, a 10-second window. In this way, the aggregated loading at the data center level is increased gradually and progressively. Depending on the outage time, this transition time period may be programmed differently. However, even with such schemes, load transition on each individual IHS still happens abruptly.

Controlled load transition techniques—that is, reloading the AC line/backup generator incrementally after operating on battery power—are referred to as "walk-in," which is defined in various specifications. For example, some specifications may define that a walk-in ramp shall not present input power steps greater than 200 W per second on the PSU AC cord input to a 1,600 W PSU, which means that the whole period of walk-in for all the PSUs is around 10 seconds. In some cases, conventional walk-in transitions may be implemented within a battery backup function inside every PSU, and the battery is interfaced with the PSU circuits at the primary 400 V bus point. In those cases, the linear load ramp or walk-in process mostly relies upon the internal control within each PSU.

The inventors hereof have recognized, however, that in more general applications (e.g., large data centers), PSUs and BBUs may be housed in separated units and placed in parallel operation with shared output DC bus (such as 12 V bus, or the like). To address these, and other concerns, the inventors hereof have developed systems and methods for controlling load transition between PSUs and BBUs as described herein.

SUMMARY

Embodiments of systems and methods for controlling a load transition between power supplies and battery units are described herein. In an illustrative, non-limiting embodiment, a system may include a Power Supply Unit (PSU) coupled to an Information Handling System (IHS) via a power transmission interface; a Backup Battery Unit (BBU) coupled to the IHS via the power transmission interface and in parallel with the PSU via a current sharing bus, where the PSU and the BBU are each configured to output a current sharing signal onto the current sharing bus that is indicative of the PSU's or BBU's current being supplied to the IHS via the power transmission interface; and a controller within the BBU, the controller configured to: determine that the PSU is turned off; allow the BBU to supply all current consumed by the IHS via the power transmission interface while the PSU is turned off; reduce a current sharing scaling factor of the BBU; determine that the PSU is turned back on; and increase the current sharing scaling factor of the BBU.

In some cases, the current sharing scaling factor may be given by a ratio between: (a) a voltage range of the current sharing signal output by the BBU or PSU; and (b) a rated current of the BBU or PSU. Reducing the current sharing scaling factor of the BBU may include reducing the voltage range. The controller may be further configured to increase an output voltage of the BBU above a rated voltage of the PSU. Increasing the current sharing scaling factor may include increasing the current sharing scaling factor non-linearly to cause a linear increase in the PSU's output current when the PSU is turned on. Additionally or alternatively, increasing the current sharing scaling factor may include increasing the current sharing scaling factor linearly to cause a non-linear increase in the PSU's output current after the PSU is turned on. Additionally or alternatively, increasing the current sharing scaling factor of the BBU may include increasing the current sharing scaling factor for a selected amount of time.

In another illustrative, non-limiting embodiment, a memory storage device may have program instructions stored thereon that, upon execution by a controller within a BBU of an IHS, cause the BBU to: determine that a PSU coupled to the IHS via a power transmission interface is turned off; allow the BBU to supply all current consumed by the IHS via the power transmission interface while the PSU is turned off, where the PSU and the BBU are each configured to output a current sharing signal onto a current sharing bus that is indicative of the PSU's or BBU's current being supplied to the IHS via the power transmission interface; reduce a current sharing scaling factor of the BBU; determine that the PSU is turned back on; and increase the current sharing scaling factor of the BBU.

In some cases, the current sharing scaling factor may be given by a ratio between: (a) a voltage range of the current sharing signal output by the BBU; and (b) a rated current of the BBU. Reducing the current sharing scaling factor of the BBU may include reducing the voltage range. The controller may be further configured to increase an output voltage of the BBU above a rated voltage of the PSU. Increasing the current sharing scaling factor may include increasing the current sharing scaling factor non-linearly to cause a linear increase in the PSU's output current when the PSU is turned on. Additionally or alternatively, increasing the current sharing scaling factor may include increasing the current sharing scaling factor linearly to cause a non-linear increase in the PSU's output current after the PSU is turned on. Additionally or alternatively, increasing the current sharing scaling factor of the BBU includes increasing the current sharing scaling factor for a selected amount of time.

In yet another illustrative, non-limiting embodiment, a method may include determining that a PSU coupled to an IHS via a power transmission interface is turned off; allowing a BBU coupled to the IHS via the power transmission interface and in parallel with the PSU via a current sharing bus to supply all current consumed by the IHS via the power transmission interface while the PSU is turned off, where the PSU and the BBU are each configured to output a current sharing signal onto the current sharing bus that is indicative of the PSU's or BBU's current being supplied to the IHS via the power transmission interface; reducing a current sharing scaling factor of the BBU; determining that the PSU is turned back on; and increasing the current sharing scaling factor of the BBU.

In some cases, the current sharing scaling factor may be given by a ratio between: (a) a voltage range of the current sharing signal output by the BBU; and (b) a rated current of the BBU. Reducing the current sharing scaling factor of the BBU may include reducing the voltage range. Increasing the current sharing scaling factor may include increasing the current sharing scaling factor non-linearly to cause a linear increase in the PSU's output current when the PSU is turned on. Additionally or alternatively, increasing the current sharing scaling factor may include increasing the current sharing scaling factor linearly to cause a non-linear increase in the PSU's output current after the PSU is turned on. Additionally or alternatively, increasing the current sharing scaling factor of the BBU may include increasing the current sharing scaling factor for a selected amount of time.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
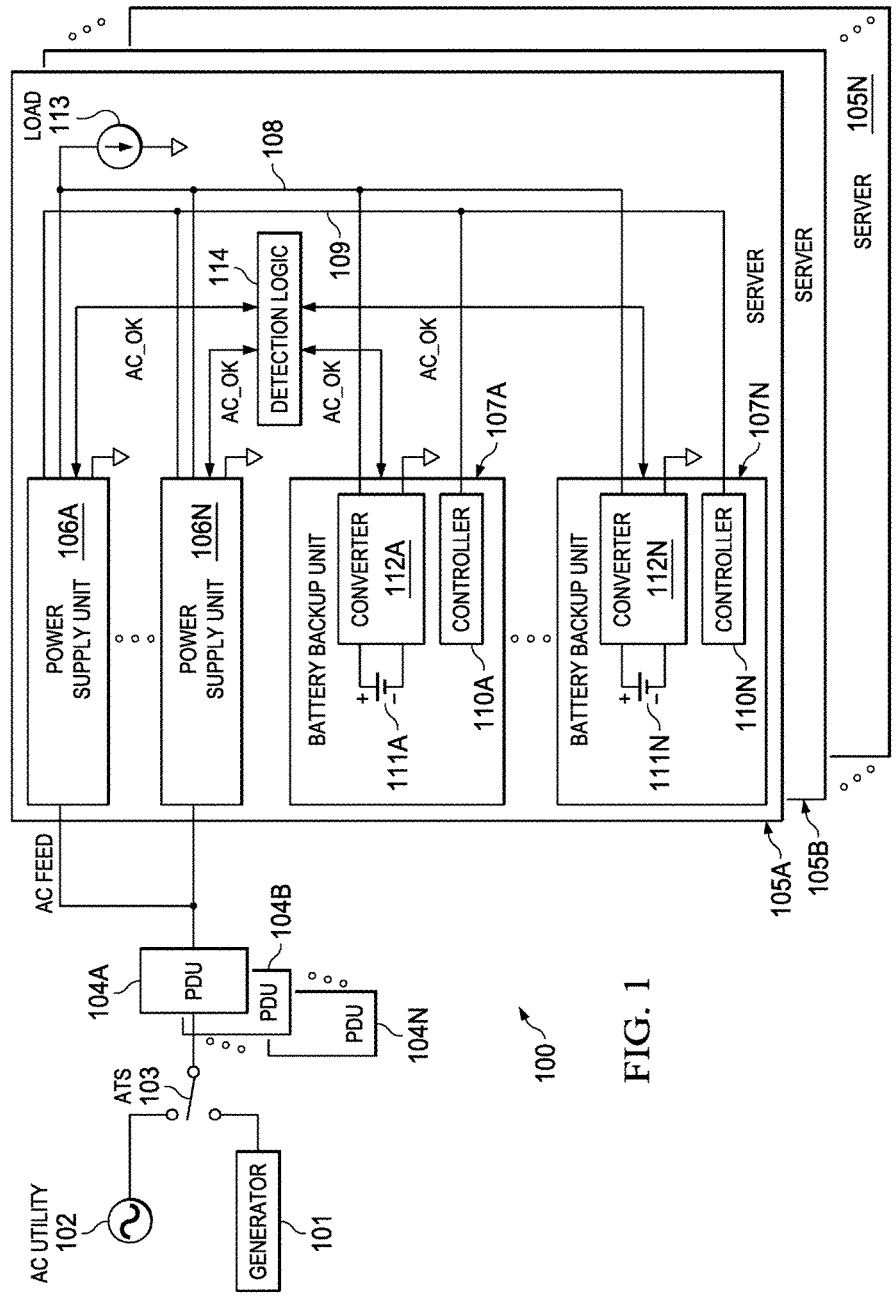
FIG. 1 is a block diagram of an example of a system for controlling load transition between Power Supply Units (PSUs) and Battery Backup Units (BBUs) according to some embodiments.

FIG. 1 is a block diagram of an example of system 100 for controlling load transition between Power Supply Units (PSUs) 106A-N and Battery Backup Units (BBUs) 107A-N. In various embodiments, system 100 may be used, for example, to power a plurality of Information Handling Systems (IHSs) 105A-N.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Returning to FIG. 1, AC utility 102 (e.g., 208 V) and backup generator 101 are coupled to Power Distribution Units (PDUs) 104A-N via at least one automatic transfer switch (ATS) 103. Each of PDUs 104A-N is coupled to a corresponding one of IHSs 105A-N such that an AC feed, whether from AC utility 102 or generator 101, is provided to PSUs 106A-N within each of IHSs 105A-N. The electrical load presented by each IHS 105 is symbolically represented by a lump sum system load 113, which is coupled to PSUs 106A-N (coupled to each other in parallel) via power transmission interface or bus 108.

Each IHS 105 further includes a plurality of BBUs 107A-N. Each of BBUs 107A-N includes a corresponding DC battery 111A-N, converter 112A-N, and controller 110A-N (described in FIG. 5); and is also coupled to load 113 via power transmission bus 108. In addition, each of BBUs 107A-N is coupled in parallel to PSUs 106A-N via current sharing bus 109. As described in more detail below, PSUs 106A-N and BBUs 107A-N are each configured to output a current sharing signal ($I_{OUT}$) onto current sharing bus 109 that is indicative of the PSU's or BBU's current being supplied to system load 113 via power transmission interface 108. This amplitude of this signal is proportional to the current supplied by corresponding PSU or BBU. This current sharing bus 109 is also monitored by each PSU and BBU for their own control purpose, which is configured to implement methods for effecting the various load transition techniques discussed herein. Detection logic 114 is located at the system to convert AC_OK signal to be bi-directional.

In many cases, these techniques may be implemented in response to the AC_OK signal being de-asserted when a PSU detects that its AC feed has lost power.

In operation, every time the AC feed is lost (e.g. due to failure of AC utility 102 and/or generator 101), after BBU 107 takes over the system load 113 and after a predetermined time delay, BBU 107 changes its current share scaling factor to a much lower value by reducing its current share voltage range (e.g., to a maximum of 1 V instead of the normal or nominal 7 V). Then, when AC power is back and BBU 107 receives the AC_OK signal back from PSU 106 or system, after another predetermined time delay, BBU 107 increases its current share scaling factor from the previously lowered value back to its normal or nominal value, and it may continue to increase this factor up to, for example, approximately three times the normal or nominal value or range, to achieve a linear load increase for the PSU.

In most active current sharing methods (e.g., Master-Slave, average mode, etc.), a voltage signal proportional to the PSU's 106 output current is generated and sent out through current sharing bus 109. Depending on the current sharing method, current sharing signals from the PSUs 106 in parallel are generated and applied on to the current sharing bus, where they are combined, and the resulting value is used as the current sharing reference inside each PSU 106.

For example, in the case of master/slave current sharing, the largest signal will drive the current sharing bus 109, while in average current sharing, an average of all of the signals is used. The range of this signal in some cases, may be 0 V to 7 V from 0 A to full load.

The term "current sharing scaling factor" (G) is defined herein, for each PSU or BBU, as a ratio of the aforementioned signal range to the full load of the PSU or BBU. For a PSU, for instance, $G_{PSU}$ is given by:

$$G_{PSU} = \frac{\text{Signal range}}{\text{PSU rated current}}$$

And, for a BBU, $G_{BBU}$ is given by:

$$G_{BBU} = \frac{\text{Signal range}}{\text{BBU rated current}}$$

As noted above, various techniques described herein are based upon intentionally changing the value of G, for example, by changing the signal range when the AC feed is lost and/or during the walk-in process.

Figure 2:
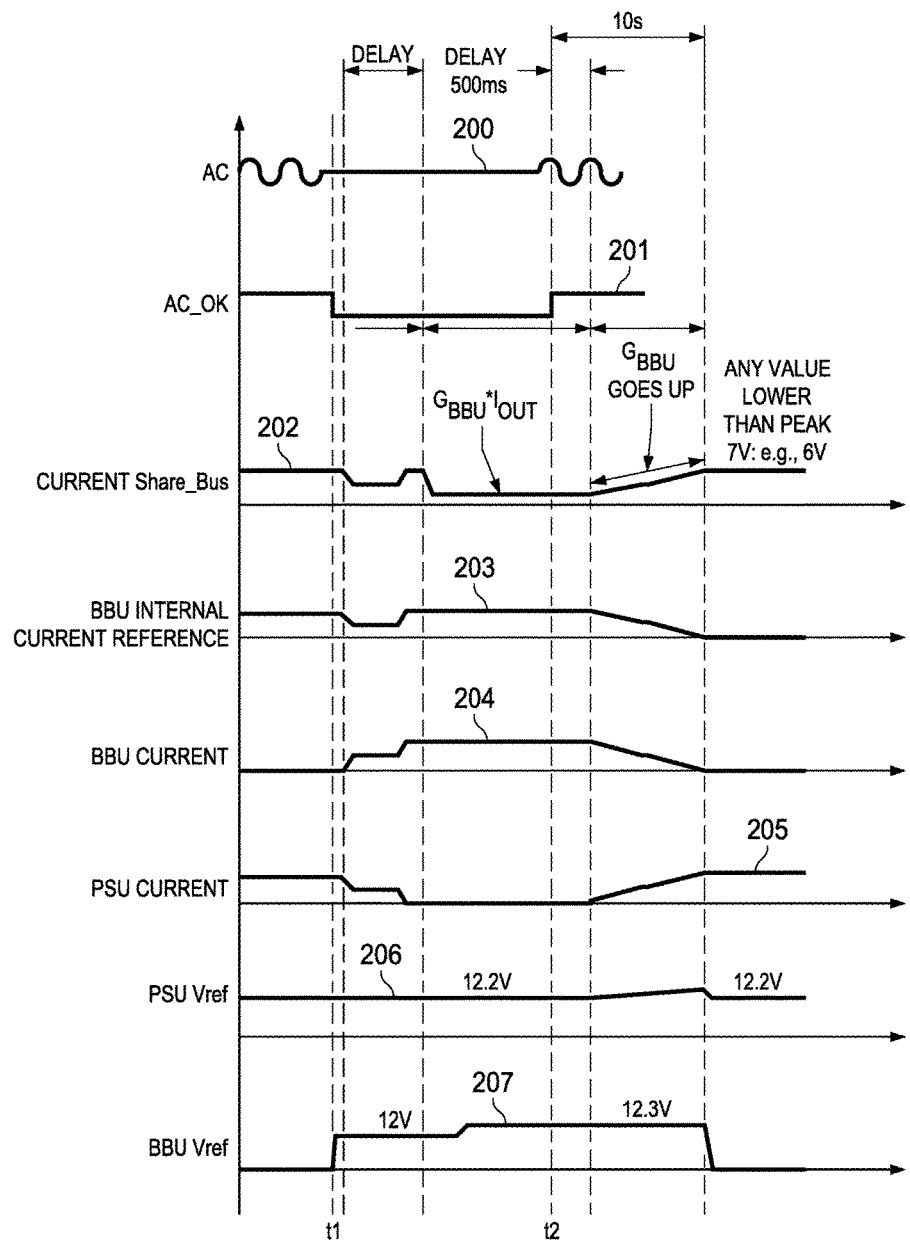
FIG. 2 is a graph illustrating signals involved in the operation of a system for controlling the load transition according to some embodiments.

FIG. 2 is a graph illustrating signals involved in the operation of system 100 according to some embodiments. Curve 200 shows the AC feed, curve 201 shows the AC_OK signal, curve 202 shows the voltage on current share bus 109, curve 203 shows a BBU's 107 internal current reference, curve 204 shows the BBU's 107 output current, curve 205 shows the PSU's 106 output current, curve 206 shows a PSU's 106 reference voltage, and curve 207 shows a BBU's 107 reference voltage.

The timeline of the events for FIG. 2 may be explained as follows. After a delay from time t1 or when PSU 106 is shut down (AC_OK de-asserted) and BBU 107 takes over all of the current, BBU 107 reduces the range of its current sharing signal (e.g., from 0-7 V to 0-1 V), thereby reducing its current sharing scaling factor, and also raises its output voltage 207 (e.g., from 12 V to 12.3 V) higher than PSU reference voltage 206. When AC comes back at time t2 and PSU 106 becomes alive, it initially does not supply any current 205 because of its lower reference voltage in comparison to the BBU voltage 204. Because the voltage on current sharing bus 109 is also very low, PSU 106 provides a smaller current, which prevents a large load inrush.

After a delay (e.g., 500 ms), BBU 107 ramps up its current sharing scaling factor all the way to normal value, and continues to ramp it up after than, until current sharing bus 109 reaches its equilibrium corresponding to the load current and PSU 106 takes over to drive current share bus 109. This method applies to both Master-Slave current sharing and average current sharing.

A benefit of reducing the current sharing signal range during the backup period, instead of disabling it entirely, is not only to force PSU 106 to reduce its current at startup, but also to make sure that multiple BBUs 107 share the power demand to a certain degree. BBU 107 may shut down either after, for example, 10 seconds, or when BBU current reaches a threshold (e.g., 5%) of its rating.

The manner in which the current sharing scaling factor is changed determines how the BBU current is reduced. In general, BBU current ($I_{BBU}$) can be calculated using the equation below:

$$I_{BBU} = \frac{G_{PSU}}{G_{PSU} + G_{BBU}} \cdot I_{Load}$$

If it is desired that the BBU current be dropped linearly, it is possible to change $G_{BBU}$ in a way that $G_{BBU}$ follows a linear pattern over time. For instance, if it is desirable that the BBU current follow the equation:

$$I_{BBU} = I_{BBU,0} - k \cdot (t - t_0));$$

where $I_{BBU,0}$ is $I_{BBU}$ at time $T_0$, then $G_{BBU}$ may be determined according to:

$$G_{BBU} = G_{PSU} \cdot \left( \frac{I_{Load}}{I_{BBU,0} - k \cdot (t - t_0)} - 1 \right)$$

It should be noted that, when following this pattern, $G_{BBU}$ takes very low values initially, which can jeopardize current sharing capability between BBUs if there are more than one BBU in system 100. Therefore, in some cases, a higher initial $G_{BBU}$ value may be chosen.

When AC_OK comes back, if the system load current is only a portion of the rated current, the scaling factor may be changed to $$G = \frac{\text{Signal range}}{\text{Present current}}.$$

This change ensures that load transition will finish in the same time frame that was originally intended when load current was at its rated level.

Figure 3:
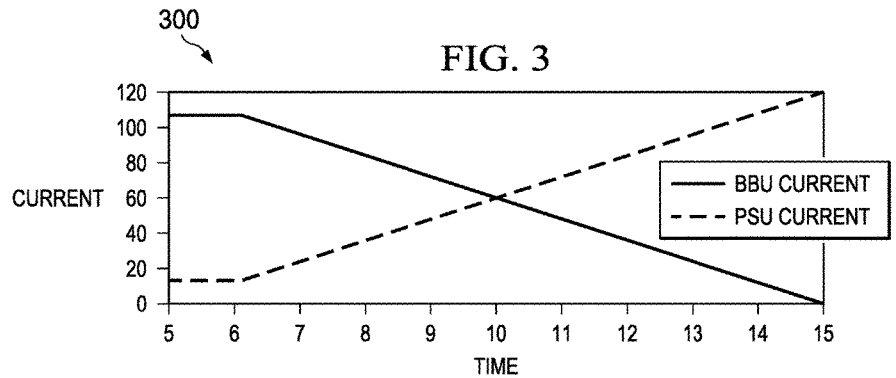
FIGS. 3 and 4 are graphs illustrating a simulated linear load transition according to some embodiments.
Figure 4:
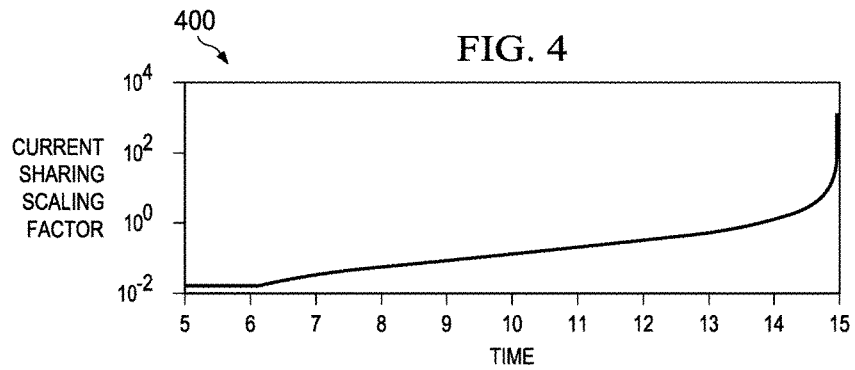

FIGS. 3 and 4 are graphs illustrating a simulated linear load transition according to some embodiments. Graph 300 shows that the PSU's output current linearly increases as the BBU's output current linearly decreases. Graph 400 shows the current sharing scaling factor being varied for the BBU non-linearly in order to cause the linear change seen in graph 300. It should be noted that the transition time in this example takes approximately 10 seconds.

Figure 5:
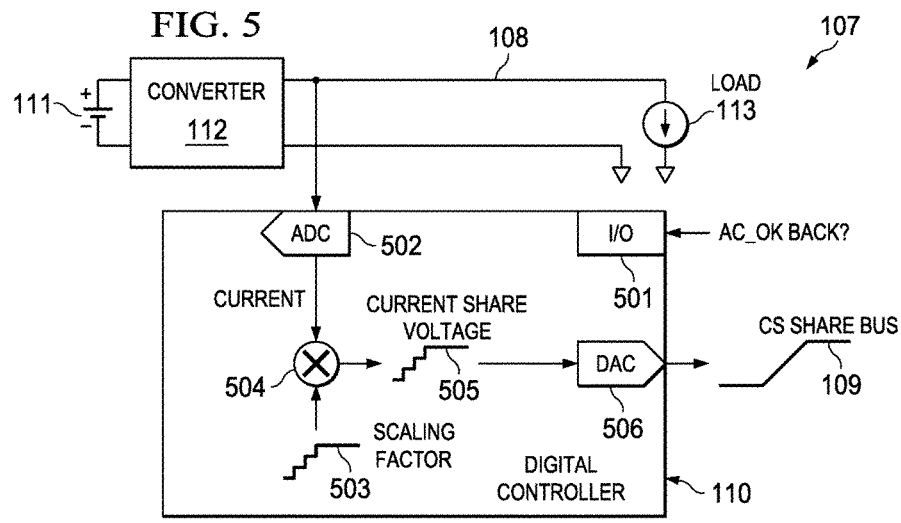
FIG. 5 is a block diagram illustrating an example of a controller configured to effect a load transition according to some embodiments.

FIG. 5 is a block diagram illustrating an example of digital controller 110 inside the BBU 107 configured to effect a load transition according to some embodiments. DC battery 111 and converter 112 are coupled to load 113 via power transmission bus 108, as previously shown in FIG. 1. Internal digital controller 110 includes I/O pin 501 configured to receive the AC_OK signal from PSU 106. When the AC_OK signal is de-asserted, internal controller 110 may implement the aforementioned techniques.

Particularly, A/D converter 502 samples the output current provided by BBU 107 on bus 108 and mixer 504 multiples that current by scaling factor 503. The resulting current share voltage 505 is converted into an analog signal by D/A converter 506 and injected into current sharing bus 109. As noted above, the manner in which scaling factor 503 is generated may depend upon the application. In the examples discussed previously, scaling factor 503 is varied non-linearly (graph 400) in order to effect a linear load transition (graph 300). In other cases, however, scaling factor 503 may be varied linearly to cause a non-linear load transition.

Figure 6:
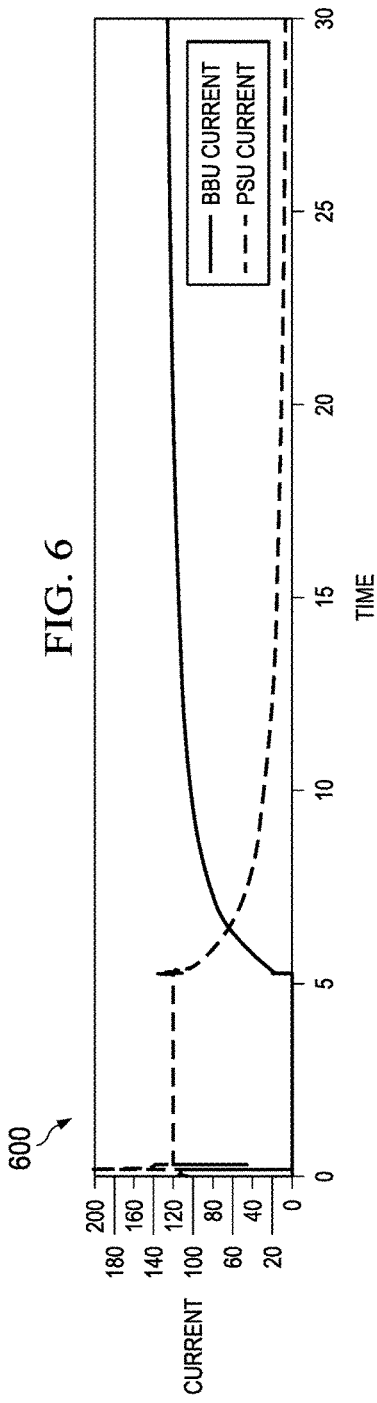
FIGS. 6 and 7 are graphs illustrating a simulated non-linear load transition according to some embodiments.
Figure 7:
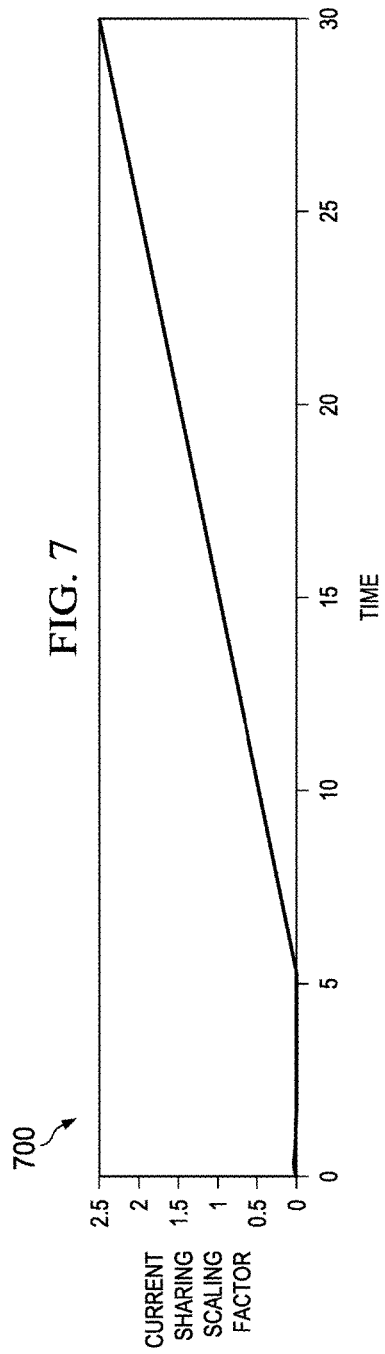

FIGS. 6 and 7 illustrate a simulated non-linear load transition according to some embodiments. Graph 600 shows the PSU's output current non-linearly increasing as the BBU's output current non-linearly decreases. Graph 700 shows the current sharing scaling factor being varied for the BBU linearly in order to cause the non-linear change seen in graph 600. In order to effect a non-linear transition in this example, it should be noted that the transition time still takes approximately 10 seconds; although the current sharing factor continues to be manipulated beyond that interval (that is, well after the PSU has assumed all the load) for approximately 30 seconds.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system, comprising:
a Power Supply Unit (PSU) coupled to an Information Handling System (IHS) via a power transmission interface;
a Backup Battery Unit (BBU) coupled to the IHS via the power transmission interface and in parallel with the PSU via a current sharing bus, wherein the PSU and the BBU are each configured to output a current sharing signal onto the current sharing bus that is indicative of the PSU's or BBU's current being supplied to the IHS via the power transmission interface; and
a controller within the BBU, the controller configured to:
determine that the PSU is turned off;
allow the BBU to supply all current consumed by the IHS via the power transmission interface while the PSU is turned off;
apply a scaling factor to a current sharing signal provided by the BBU over the current sharing bus;
determine that the PSU is turned back on; and
increase the scaling factor in response to the determination.

2. The system of claim 1, wherein the scaling factor is given by a ratio between: (a) a voltage range of the current sharing signal output by the BBU or PSU; and (b) a rated current of the BBU or PSU.

3. The system of claim 1, wherein application of the scaling factor reduces a given first range of possible voltage values to a second range of possible voltage values for the current sharing signal.

4. The system of claim 2, wherein the controller is further configured to increase an output voltage of the BBU above a rated voltage of the PSU.

5. The system of claim 1, wherein increasing the scaling factor includes increasing the scaling factor non-linearly to cause a linear increase in the PSU's output current when the PSU is turned on.

6. The system of claim 1, wherein increasing the scaling factor includes increasing the scaling factor linearly to cause a non-linear increase in the PSU's output current after the PSU is turned on.

7. The system of claim 1, wherein increasing the scaling factor includes increasing the scaling factor for a selected amount of time.

8. A memory storage device having program instructions stored thereon that, upon execution by a controller within a Backup Battery Unit (BBU) of an Information Handling System (IHS), cause the BBU to:
determine that a Power Supply Unit (PSU) coupled to the IHS via a power transmission interface is turned off;
supply all current consumed by the IHS via the power transmission interface while the PSU is turned off, wherein the PSU and the BBU are each configured to output a current sharing signal onto a current sharing bus that is indicative of the PSU's or BBU's current being supplied to the IHS via the power transmission interface;

apply a scaling factor to a current sharing signal provided by of the BBU over the current sharing bus;

determine that the PSU is turned back on; and increase the scaling factor in response to the determination.

9. The memory storage device of claim 8, wherein the scaling factor is given by a ratio between: (a) a voltage range of the current sharing signal output by the BBU; and (b) a rated current of the BBU.

10. The memory storage device of claim 8, wherein application of the scaling factor reduces a given first range of possible voltage values to a second range of possible voltage values for the current sharing signal.

11. The memory storage device of claim 8, wherein the controller is further configured to increase an output voltage of the BBU above a rated voltage of the PSU.

12. The memory storage device of claim 8, wherein increasing the scaling factor includes increasing the scaling factor non-linearly to cause a linear increase in the PSU's output current when the PSU is turned on.

13. The memory storage device of claim 8, wherein increasing the scaling factor includes increasing the scaling factor linearly to cause a non-linear increase in the PSU's output current after the PSU is turned on.

14. The memory storage device of claim 8, wherein increasing the scaling factor includes increasing the scaling factor for a selected amount of time.

15. A method, comprising:

determining that a Power Supply Unit (PSU) coupled to an Information Handling System (IHS) via a power transmission interface is turned off;

allowing a Backup Battery Unit (BBU) coupled to the IHS via the power transmission interface and in parallel with the PSU via a current sharing bus to supply all current consumed by the IHS via the power transmission interface while the PSU is turned off, wherein the PSU and the BBU are each configured to output a current sharing signal onto the current sharing bus that is indicative of the PSU's or BBU's current being supplied to the IHS via the power transmission interface;

applying a scaling factor to a current sharing signal provided by the BBU over the current sharing bus;

determining that the PSU is turned back on; and increasing the scaling factor in response to the determination.

16. The method of claim 15, wherein the scaling factor is given by a ratio between: (a) a voltage range of the current sharing signal output by the BBU; and (b) a rated current of the BBU.

17. The method of claim 15, wherein application of the scaling factor reduces a given first range of possible voltage values to a second range of possible voltage values for the current sharing signal.

18. The method of claim 15, wherein increasing the scaling factor includes increasing the scaling factor non-linearly to cause a linear increase in the PSU's output current when the PSU is turned on.

19. The method of claim 15, wherein increasing the scaling factor includes increasing the scaling factor linearly to cause a non-linear increase in the PSU's output current after the PSU is turned on.

20. The method of claim 15, wherein increasing the scaling factor of the BBU includes increasing the scaling factor for a selected amount of time.

* * * * *